(12) United States Patent
Fahrny et al.

(10) Patent No.: US 10,193,873 B2
(45) Date of Patent: Jan. 29, 2019

(54) KEY DERIVATION FOR SECURE COMMUNICATIONS

(75) Inventors: James W. Fahrny, Parker, CO (US); Pete Kuykendall, Centennial, CO (US); Nancy Davoust, Louisville, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 763 days.

(21) Appl. No.: 12/895,121

(22) Filed: Sep. 30, 2010

(65) Prior Publication Data
US 2012/0084806 A1 Apr. 5, 2012

(51) Int. Cl.
*H04L 9/30* (2006.01)
*H04L 29/06* (2006.01)
*G11B 20/00* (2006.01)

(52) U.S. Cl.
CPC .......... *H04L 63/06* (2013.01); *G11B 20/0021* (2013.01); *G11B 20/00478* (2013.01); *H04L 9/30* (2013.01); *H04L 63/068* (2013.01); *H04L 2463/061* (2013.01); *H04L 2463/101* (2013.01)

(58) Field of Classification Search
CPC ........................................................ H04L 9/30
USPC ............................. 725/31; 380/273, 277, 31
See application file for complete search history.

(56) References Cited

U.S. PATENT DOCUMENTS

| | | | | |
|---|---|---|---|---|
| 6,895,504 B1 * | 5/2005 | Zhang | .................... | H04N 7/165 348/E7.056 |
| 8,477,948 B2 * | 7/2013 | Shon | .................... | H04W 12/04 380/255 |
| 2001/0050990 A1 * | 12/2001 | Sudia | ..................... | G06Q 20/02 380/286 |
| 2007/0136593 A1 * | 6/2007 | Plavcan | .................. | G06F 21/34 713/172 |
| 2007/0237332 A1 * | 10/2007 | Lyle | .......................... | H04L 9/12 380/263 |
| 2010/0074446 A1 * | 3/2010 | Fuchs | .................. | H04L 9/0833 380/278 |
| 2010/0091986 A1 * | 4/2010 | Wakayama | ......... | G06F 21/6209 380/44 |
| 2010/0119060 A1 | 5/2010 | Nishida | | |

(Continued)

FOREIGN PATENT DOCUMENTS

| | | |
|---|---|---|
| CA | 2753000 | 9/2011 |
| EP | 11182311.8 | 9/2011 |
| GB | 2417652 A | 3/2006 |

OTHER PUBLICATIONS

Lily Chen, "NIST Special Publication 800-56C, Recommendation for Key Derivation through Extraction-then-Expansion" Computer Security Division, Information Technology Laboratory, Computer Security, Sep. 2010, U.S. Department of Commerce, National Institute of Standards and Technology, 13 pages.

(Continued)

*Primary Examiner* — Michael H Hong
(74) *Attorney, Agent, or Firm* — Banner & Witcoff, Ltd.

(57) ABSTRACT

A security system is disclosed in which a device-specific key value is provided to a security processing device, and then used to derive additional derived keys for use in secured communications. In response to identifying a compromise of the derived keys, the system can be instructed to derive new or replacement derived keys for use in the secured communications. In some embodiments, the security system can be used in a video reception device, to decrypt encrypted video content.

20 Claims, 4 Drawing Sheets

(56) References Cited

U.S. PATENT DOCUMENTS

2011/0116631 A1* 5/2011 Shon .................. H04W 12/04
 380/270
2011/0167262 A1* 7/2011 Ross et al. .................. 713/168

OTHER PUBLICATIONS

Quynh Dang, "Draft NIST Special Publication 800-135, Recommendation for Existing Application-Specific Key Derivation Functions," Computer Security Division, Information Technology Laboratory, Computer Security, Aug. 2010.
EP Search Report, Application No. 11182311.8, dated Jan. 12, 2012.
EP Office Action—EP App 11182311.8—dated Mar. 14, 2016.
Aug. 14, 2017—Canadian Office Action—CA 2,753,000.
Aug. 17, 2018—Canadian Office Action—CA 2,753,000.

* cited by examiner

KEY DERIVATION FOR SECURE COMMUNICATIONS

FIELD OF ART

The features described herein relate generally to communication security for systems that control access. Some aspects relate to key-based security.

BACKGROUND

Content service providers, such as video or television service providers, often offer portable security modules, such as smart cards, to their customers. The portable security modules may communicate with other access devices, such as satellite receivers and cable set-top boxes, to authorize those devices to receive secured content on the service provider network.

These modules and devices often employ key-based mechanisms for security, but unfortunately, hackers occasionally are able to compromise that security by figuring out the keys being used. When this occurs, the security in the system is lost, and the user may have to undergo an inconvenient re-keying process that may often involve replacing the smart card and the access device.

There remains an ever-present need for greater security, and to minimize disruptions to users' lives when a security system is compromised by a hacker.

SUMMARY

Some or all of the various features described herein may assist in preventing such security compromises, and/or in reducing the inconvenience to users when a security compromise occurs.

In some embodiments, an initial device-unique secret key may be stored into a memory (e.g., a one-time programmable memory) of a security device. That secret key may be used, along with a first seed value, to derive additional keys that can be used for communications. Upon a compromise of the derived keys, the security device can be instructed to discard the old derived keys, and to derive a new set of derived keys using a new seed value. The new derived keys may then be used for subsequent communications.

In some embodiments, the security system can be used to decrypt secure video content or other types of data. The actual video decryption and/or processing capability may be on an external security processing device from the security system, such as a smart card. That external security processing device may be supplied, via a secure session, with the derived key from the security system.

Other details and features will also be described in the sections that follow. This summary is not intended to identify critical or essential features of the inventions claimed herein, but instead merely summarizes certain features and variations thereof.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

Figure 1:
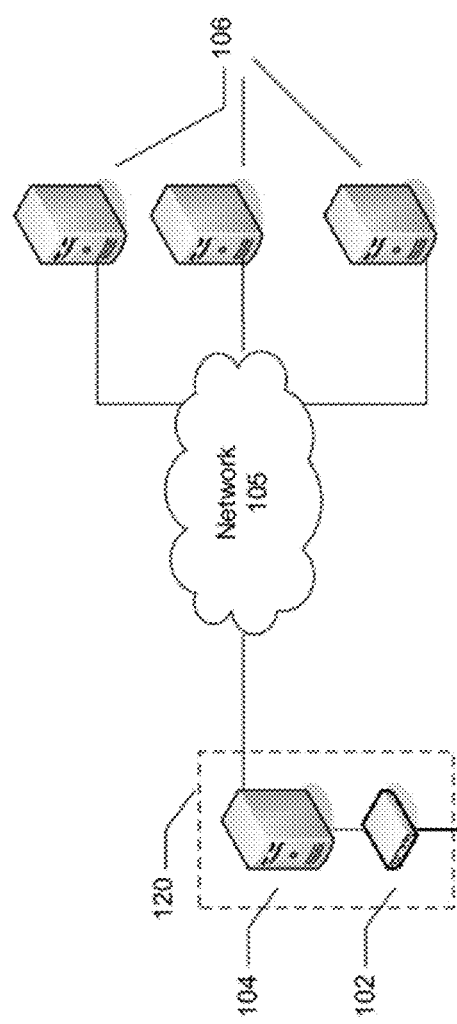
FIG. 1 illustrates an example content distribution network.
Figure 1:
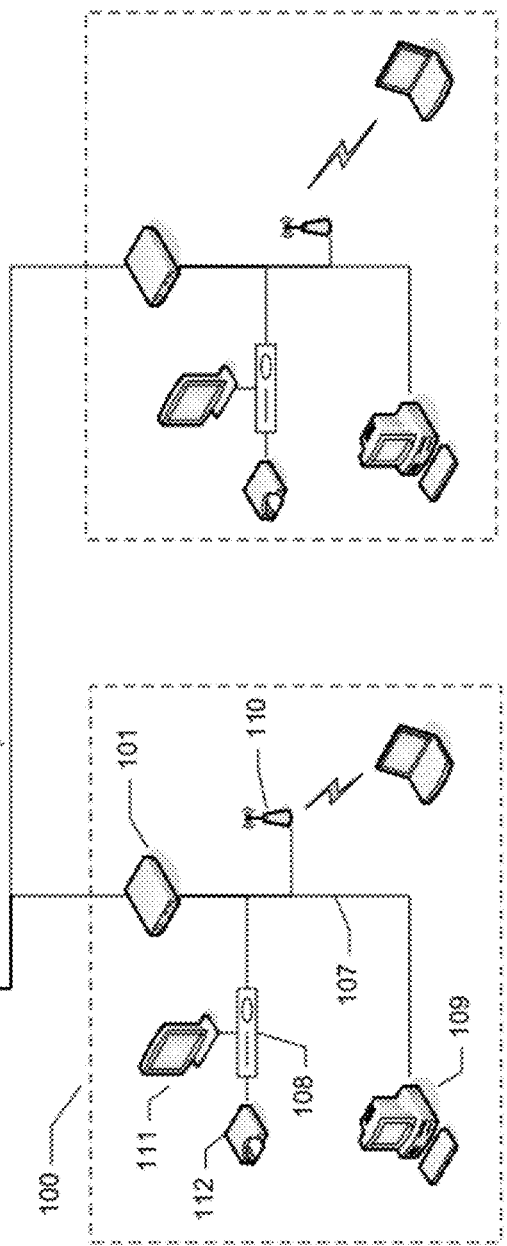

FIG. 1 illustrates an example information distribution network that can be used to access various types of information, such as video content (movies, pay-per-view, etc.), audio content, Internet Protocol data, etc. Starting with a user's home 100 (or any other location), the user may have a network interface device 101. The device 101 may be any type of device suitable for interacting with the network, such as a modem (e.g., coaxial cable modem, optical fiber modem, etc.) or service gateway that is configured to communicate with another corresponding modem or termination server 102 via communication links 103. The nature of the devices 101/102 may depend on the type of communication links 103 being used. For example, links 103 may be coaxial cables, in which case the devices 101/102 may be a coaxial cable modem and a cable modem termination server, respectively. Other types of communication links and associated devices may be used as well, such as optical lines, hybrid fiber/coaxial cable (HFC), satellite, cellular telephone, local wireless WIMAX, etc., and different corresponding types of interface devices 101/102 may be used.

The termination server 102 may be located external to the home 100, such as at a central office 120 (e.g., a headend in an HFC-type network). The termination server 102 may communicate with one or more other servers 104, which may in turn be connected to an even larger communication network 105. Communication network 105 may be any desired type of network, such as a wide area network (WAN), cellular telephone, satellite network, Internet, intranet, etc., and may offer connection to even more servers 106. Those other servers 106 may, in turn, provide various types of services, such as delivery of video content, Internet commerce, etc.

Within the home, the network interface device 101 may allow any device in the home to access the external modem termination server 102 and, in turn, any of the other servers 104/106 and network 105. To provide this connectivity, the device 101 may be connected to one or more in-home communication networks 107 (e.g., in-home coaxial cable, MoCA (Multimedia Over Coax Alliance), Ethernet, power line network, wireless network, etc.). Other devices, such as a video interface device 108 (e.g., set-top box, digital video recorder, display device, etc.), computer 109, or wireless access point 110 may also be connected to the in-home network, and may use the network to communicate with the network interface device 101. In some embodiments, a home may have multiple interface devices 101, and in other embodiments, some or all of the interface devices 101 may be integrated into the various devices described herein. So, for example, a video interface device such as a set-top box 108 may include a built-in interface device 101, such as a modem 101. In the example of FIG. 1 video interface devices 108 and 101 are illustrated separately.

The in-home devices may use the interface device 101 for any variety of purposes, such as accessing the Internet, accessing servers 106, etc. Some devices, such as video interface device 108, may use the interface device 101 to receive video content that is then displayed on a display device, such as a television, mobile device, or computer monitor 111.

To provide secure access to that content, the supplier of the content (e.g., a content server 106, or server 104, or another entity or device), may encrypt the content when delivering it to the interface device 101 and video interface device 108. The video interface device 108 may need to or be required to decrypt the data or content before displaying it on the display device 111 (which may be integrated with the video interface device 108 in some embodiments). Decryption can be performed by the video interface device 108 using a decryption key (e.g., a Content Key) that is stored within the video interface device 108. Alternatively, decryption can be performed by an external security module 112, such as a smart card, that is provided separately to the user. Having the separate module 112 may allow users to purchase video interface devices 108 from a source other than the content provider (e.g., a video content provider), and to merely obtain, for example, a small card from the content provider. Additional details regarding such a secure access device are shown and discussed with reference to FIG. 2.

Figure 2:
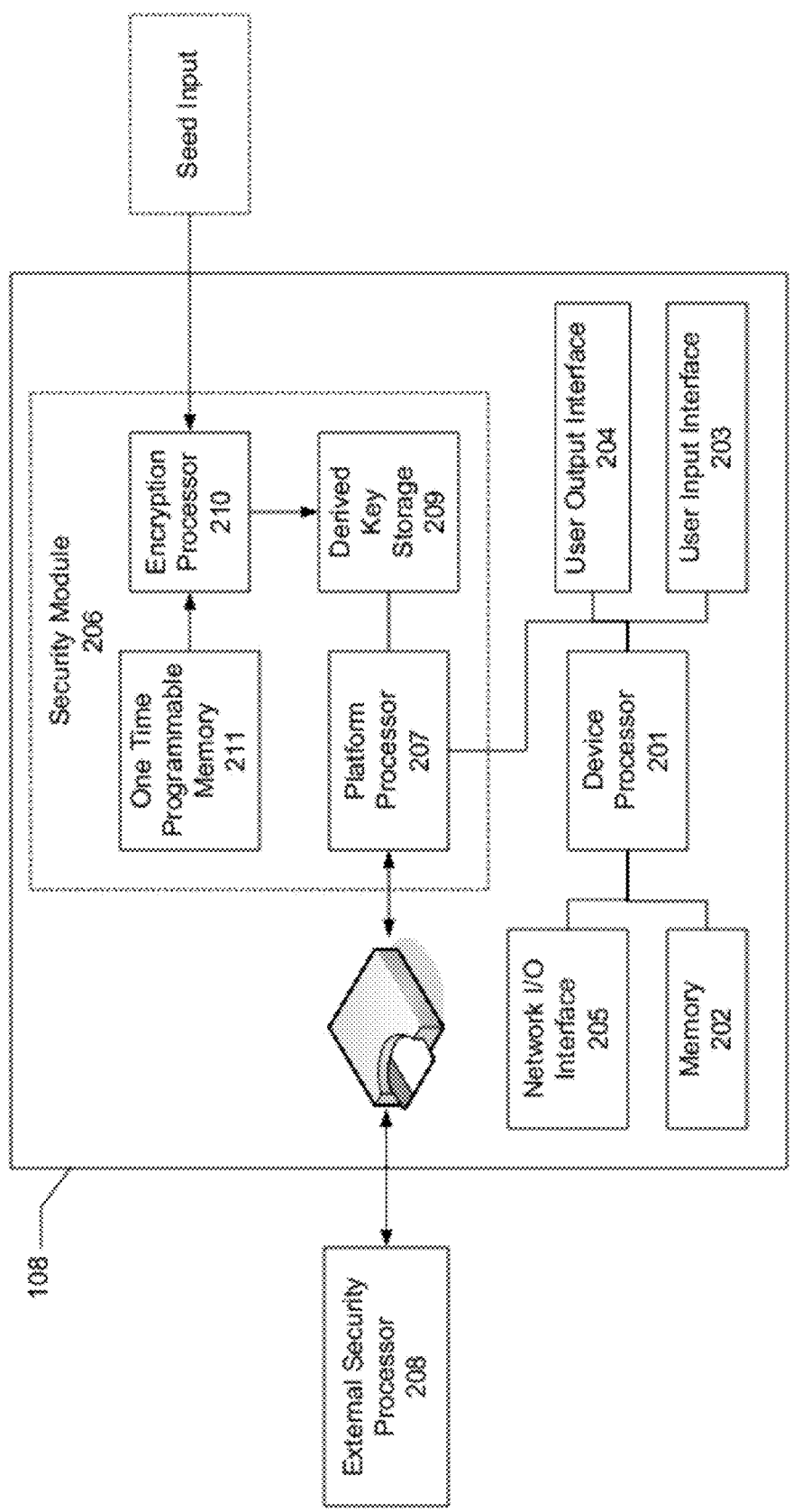
FIG. 2 illustrates an example content access device.

FIG. 2 illustrates an example embodiment of a secure content access device, such as a video interface device 108 (e.g., a television, computer, a set-top box, digital video recorder, mobile phone and/or video device, etc.). The video interface device 108 may include one or more processors 201. The processor 201 may be general purpose or application specific, and may be configured to execute software instructions that are stored on a computer-readable memory 202 to cause the video interface device 108 to perform, or direct another device to perform, any of the features and methods described herein. The memory 202 may be any desired type of computer-readable medium, such as one or more hard drives, magnetic and/or optical disk drives, FLASH memory, etc.

The processor 201 may receive inputs and commands from a user via one or more user input interfaces 203. A wide variety of user input interfaces 203 may be used. For example, the user input interface 203 may include an infrared receiver circuit, configured to receive inputs from a handheld infrared remote control (other forms of wireless communication, such as radio frequency (RF) and BLUETOOTH may also be used). The input interface 203 may include one or more pushbuttons physically located on a chassis of the device 108. Other user input interfaces may include keyboards, mice, touch pad, microphone, etc.

The processor 201 may also provide outputs to the user via one or more output user interfaces 204. Any desired type of output user interface can be used. For example, the output interface 204 may include a video signal interface (e.g., HDMI—High Definition Multimedia Interface video, analog/component/composite video, VGA—Video Graphics Adapter, DVI—Digital Video Interface, etc.), audio signal interface (e.g., multiple audio channel output lines, piezoelectric buzzers, etc.), wireless output (may be combined with wireless user input interface 203 as well).

As noted above, the video interface device 108 may be used to receive content (e.g., video, audio, data, etc.) from an external source, such as a video content server. To facilitate communicating with that external source (which communications may pass through network interface device 101), the video interface device 108 may include one or more network input/output interfaces 205. The interface 205 may be of any desired type, such as an Ethernet, USB (Universal Serial Bus), coaxial, MoCA (Multimedia over Coaxial Alliance), etc. In some embodiments, the network interface device 101 may be incorporated as part of the video interface device 108, so the interface 205 may simply be a direct board-level connection, or internal wiring/cabling. The interface 205 need not be limited to communicating with the network interface device 101, and instead may also include circuitry and components for communicating with other networks as well, such as networks in the home, local Wi-Fi (e.g., IEEE 802.11)/WIMAX, etc.

As also noted above, the content received by the device 108 may be in an encrypted form for security. To handle the decryption of that content, the device 108 may include a security module, such as a security application specific integrated circuit (ASIC) 206, for example. The security module 206 may include its own processing capability, such as a security platform processor 207, for coordinating and managing the decryption of the encrypted content. In some embodiments, the actual decryption is handled by circuitry on an external security processor, such as a removable smart card 208, and the platform processor 207 coordinates the encryption communications. In some embodiments, the external security device 208 may establish its own secure channel with the source of the content. The external security device 208 may be any form factor, such as USB (Universal Serial Bus), PCMCIA (PC Card), etc., and can be any removable format other than a card (e.g., a USB dongle, external processor, circuit board, etc.). The encryption and use of the external security device 208 will be discussed in greater detail below with reference to FIG. 3.

The decryption (and encryption) may typically involve the use of one or more encryption/decryption keys. The keys, which are typically secret data values, may be stored in a secure memory or key storage 209. The key storage 209 may be any desired form of memory, similar to memory 202, but in some embodiments the memory contains additional security features to impede unauthorized access. For example, the contents of the storage itself may be further encrypted, such that only platform processor 207 is able to read it.

The security module 206 may also include an encryption processor 210, which may be a standalone processor circuit, or part of the software programming of the platform processor 207. The encryption processor 210 may be configured to perform a predefined encryption algorithm on data, such as triple-DES or AES, and supply the result to the key storage 209. The data provided may come from a separate chip used during manufacture, or a board level connection to an external data source, and may include one or more randomly generated seed values (e.g., a data value, such as a random number, that can eventually be manipulated to form a key). Multiple seed values can be used, for example, to derive multiple derived keys. In embodiments using multiple-keys, the different seed values can each be used with different key derivation algorithms. For example, if two seed values are provided, the security module 206 may be configured to use a first algorithm (e.g., a triple-DES algorithm) on the first seed value to derive the first derived key, and a second different algorithm (e.g., an AES algorithm) on the second seed value to derive the second derived key. Additionally, the data may include a unique key value that is individually assigned to the security module 206, and stored in a one-time programmable memory 211 as the device's one-time programmable (OTP) key. The memory 211 may be physically separate from the key storage 209, and may be protected by different types of security. For example, the storage 209 may be encrypted with a platform processor 207 key, while the memory 211 may be encrypted with an encryption processor 210 key.

Figure 3:
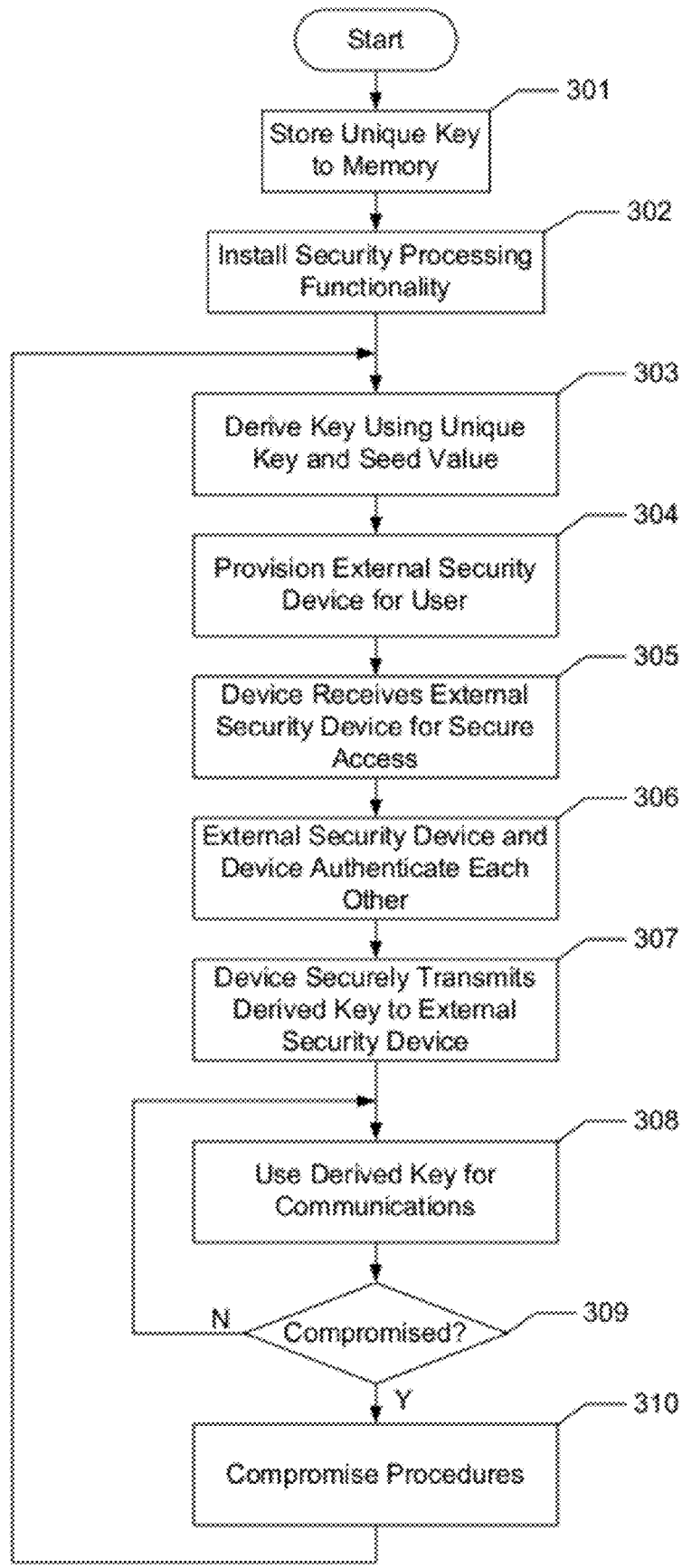
FIG. 3 illustrates an example process of keying and using a device for secure communications.

As will be discussed with reference to FIG. 3 below, the security module 206 allows for the derivation of keys by an end user device. Giving the end user device the ability to securely derive new keys is especially useful in the event of a compromise. If a hacker were able to determine the value of a decryption key (e.g., by monitoring communications flowing between the external security device 208 and platform processor 207), the system is able to simply derive a new key, without requiring replacement of the security module 206 itself. FIG. 3 (discussed below) provides an example of how this may occur, and how these keys may be derived.

FIG. 3 illustrates an example process according to an aspect of the disclosure. To start, in step 301, the security module 206 may be manufactured as having a one-time programmable (OTP) memory 211. The OTP memory 211 may be, as its name suggests, a memory device that can only be written once (e.g., of the fuse-burning type), and the service provider or manufacturer may write (or burn) into the OTP memory 211a unique key, such as an OTP key, for the security module 206. The OTP key or other type of unique key may be any desired type of data (e.g., a binary sequence, alphanumeric sequence, etc.), and may be permanently associated with the security module 206.

The manufacturer (or service provider) may store information in an association database correlating the OTP key with information identifying the security module 206 (e.g., a unique serial number, media access control (MAC) address, etc.). This may occur, for example, during wafer fabrication, chip packaging, or any other desired time prior to delivery of the security module 206 (or product containing the security module 206, for example). In some embodiments, the storing of information, e.g. security installation and key derivation steps, may be performed by the same service provider who will be providing service to the device 108, and not necessarily by the same entity who physically manufactured the security module 206 or device 108.

In step 302, the manufacturer (or service provider) may install security processing and/or functionality onto the ASIC 206, such as through installation of computer-executable instructions on a computer-readable medium coupled to the platform processor 207, or the addition of encryption circuitry. FIG. 2 illustrates an example of an encryption processor 210. This processor 210 (or the security software) may be configured to perform a predetermined type of algorithm, such as triple-DES or AES, on one or more data values.

In step 303, the encryption processor 210 may be instructed to derive one or more derived content keys. To do so, for example, the encryption processor 210 may receive the OTP key value from the OTP memory 211, and use it as the original cleartext for an eventual encryption algorithm, such as the triple-DES block cipher. To further enhance security, the original cleartext OTP key value may be modified with a seed input value prior to its encryption. Any desired type of modification can be used (e.g., simple addition, exclusive-OR, etc.), and any kind of seed value can be used (e.g., a unique value for a device such as its Media Access Control—MAC—address, a random number, or a combination of such values, etc.). The seed input may be provided to the encryption processor 210 in any desired manner, such as via a direct board-level connection, for example. The results of the encryption may then be stored in the derived key storage 209, and the association database may be updated to further identify the derived key(s) that are stored in this particular security module 206. With that, the product containing the security module 206 (e.g., a television, a computer, a television interface device (e.g., set-top box, digital video recorder, decoder, gateway interface), etc.) may then be ready for distribution to customers and end users. In alternative embodiments, this step can be performed after the security module 206 is provided to an end user, and using a trusted connection to update the association database.

An end user may obtain the device 108 (e.g., purchasing a television having device 108 and ASIC 206 built in), and may sign up with a service provider to receive, for example, encrypted video content that is transmitted by the service provider, or may wish to access encrypted data on a network. In step 304, the service provider may take steps to authorize the user's device 108 for receiving the video and/or data content. To do so, the service provider may issue the user a smart card 208 containing circuitry and/or software needed to decrypt and decode the content. For example, data decryption and video decoding software may be loaded onto a processor in the external security device 208, e.g. a smart card (or an associated computer-readable memory on the card). The service provider may also store, in its own database, pairing information indicating that the user's device (e.g., identified by its unique serial number or MAC address) is expected to work with the external security device 208 that was issued to the user. The external security device 208 itself may also include its own unique identification information for this purpose.

In step 305, the user may bring the external security device 208 home, and insert it into his/her video interface device 108. In response to this insertion, the platform processor 207 and external security device 208 may undergo a local authentication process, which may involve the platform processor 207 obtaining the smart card 208's unique identification information (e.g., its serial number or MAC address) and information identifying the video interface device 108 (or the video interface device's security module 206, or its security platform processor 207), and reporting this information as a pair to the service's server. If the pair is unauthorized, then the process can terminate. However, if the pair is authorized, then the external security device 208 and platform processor 207 may proceed to step 306, in which the external security device 208 and platform processor 207 may establish a secure session between them having a shared session key. This secure session may be, for example, created via a Diffie-Hellman key exchange, or a random challenge, using any predefined algorithm known between the two.

With a secure session in place, the platform processor 207 may then retrieve a derived key from key storage 209, and encrypt it for transmission to the external security device 208 in the secure session (e.g., encrypting it with a shared session key) at step 307. Then, in step 308, the external security device 208 may begin to use the derived key for secure communications with the service provider or network. For example, the video content may be transmitted from the service provider in an encrypted format that requires the derived key for decryption, and the external security device 208 can use this derived key to do just that—decrypt the content. The resulting decrypted content can be processed, by the external security device 208 process, device processor 201, or both, for eventual display on a device connected to the output interface 204.

The derived key can be used and reused as a secure key for the device. For example, the same derived key can be used across multiple sessions between the external security device 208 and the service provider. The same derived key can also be used for communications between the external security device 208 and other service providers, in different sessions. In some embodiments, the derived key can be used as if it were a permanent key for the device.

An advantage of the disclosure may be realized in the event of a compromise. For example, if a user pays for the access to the service provider's services, and receives an unauthorized purchase on his/her bill, the user may complain to the service provider, who may then conclude that someone has hacked into that user's system and obtained the derived key being used to send or receive the secure content. The service provider's server may transmit a signal to the user's device 108, and/or to the device's platform processor 207, indicating that there has been a security compromise. Step 309 illustrates the logical example of the device 108 determining that there has been a compromise. In response, if a compromise has occurred, the process may proceed to step 310, and actions to address the compromise may be taken.

Compromise actions may include a variety of remedial measures. For one, the secure session with the external security device, e.g., smart card 208, may be terminated by the security module 206. The security module 206 may also report back to the video interface device 108 and service server that the session with the external security device has been terminated, and may also report back additional information regarding the now-compromised card (e.g., usage history, characteristics, etc.). The compromise actions may result in a return to step 303, in which the security module 206 may re-encrypt, for example, (or perform a different function, depending on whichever key derivation algorithm is chosen for use) the security module 206's OTP key with a different seed value to produce a new derived key, storing the new key in storage 209 as done previously for the first derived key. The different seed value may be generated automatically, for example, by the security module 206, such as via a pseudo-random number generation process, or it may be delivered to the security module 206 from the service provider.

In the example of a smart card, if the seed value was generated locally by the security module 206, the security module 206 may report the new seed value back out to the service provider. The service provider may provide the seed value and security module 206 identification to the manufacturer (or whichever trusted party holds the association database), and request to have a copy of the new derived key that will result. The manufacturer (or service provider), knowing the security module identification and seed value, and knowing the encryption algorithm of the security module's processor 210, may derive the same derived key that the security module 206 will derive. The service provider can then issue, for example, a new smart card to the user, and use the new derived key for this user once that smart card comes online.

The compromise procedures may also include dissolution of the compromised pairing. For example, if the service provider learns of the compromise, then the service provider may indicate that the specific pairing of devices is no longer active. This dissolution may involve removal of the pair from a stored database, and/or the addition of a dissolved pair entry in a database. Information identifying dissolved pairs can be reviewed the next time one of the entities requests pairing, to determine whether a pairing should be approved. For example, a previously-approved pairing may be approved again with less scrutiny than a wholly new pairing, if a compromise was detected. Alternatively, if an entity is party to a large number (e.g., more than a predetermined limit) of dissolved pairs, additional scrutiny and measures may be taken to authorize a new pairing for the apparently insecure device.

The derived keys described above can be device-specific keys derived for a single device, and used by that device alone, pair-specific keys derived for use by a single pair of devices, or user or account-specific keys associated with various devices of a user or account. Alternatively, derived keys can be global, shared by multiple devices. For example, a satellite provider might use derived keys for its various customers' receivers, and due to limited bandwidth, it may encrypt its transmissions with a single global key used by all of its receivers (or by large groups of receivers). If such a derived global key is compromised, the satellite provider may wish to determine how severe the compromise was, before deciding whether to derive a new global key for its receivers.

Figure 4:
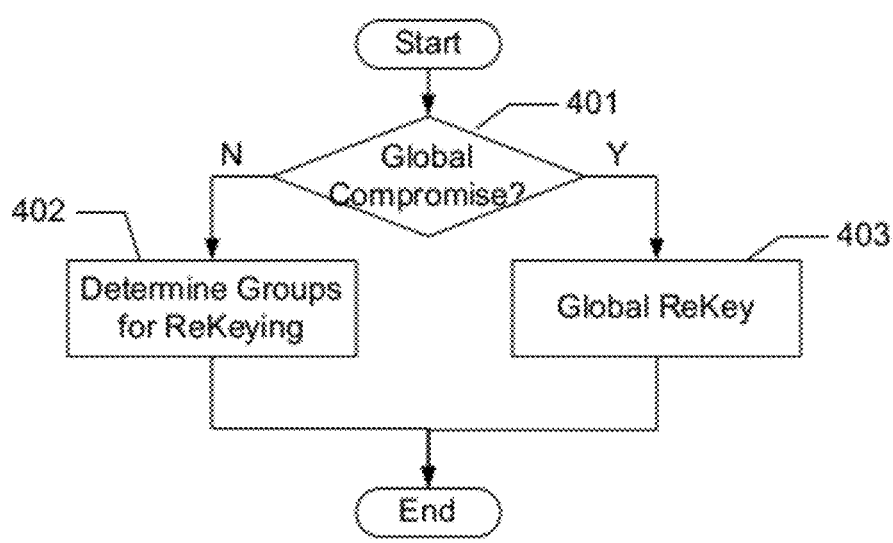
FIG. 4 illustrates an example process to address a key compromise.

FIG. 4 illustrates an example compromise procedure that can be performed, for example, as part of step 310 in the FIG. 3 process, in situations where, for example, a derived global key is compromised. In step 401, the security module (e.g., the security ASIC 206, or device processor 201, or external security server of the manufacturer or service provider) may determine, in step 401, whether the particular compromise was global in nature. This determination can depend on a variety of factors. For example, if the compromise is due to an accidental disclosure by a trusted employee to a customer, it might be deemed a relatively minor compromise affecting only a subset of users/devices including that particular user/device. By contrast, if the compromise is due to a hacker, then the compromise may be deemed a more serious, global compromise.

If, in step 401, the compromise is deemed to not be a global compromise, then the process may proceed to step 402, and one or more subsets of receivers (or other secure devices) may undergo a rekeying process to derive a new key just for them. The rest of the devices in the system may continue using their original derived keys. Alternatively, in step 401, if the compromise is a global compromise, then in step 403 all receivers may undergo the rekeying process to derive a new key.

In either case, the rekeying process may comprise or resemble the derivation, provisioning and/or authentication described above with respect to the FIG. 3 process.

The FIG. 4 discussion uses global keys as an example, in which all receivers begin with a common global key. However, the groupings can be smaller, without requiring all receivers in the system to share the same key. For example, the overall group of receivers in the system may be subdivided, or splintered, into smaller and smaller groups with each successive compromise. So the initial "global" set or receivers may be just be a subset of receivers in the overall system (e.g., a batch of 1000 satellite receivers), and an even smaller subset may be defined if a non-global compromise happens to the set (e.g., a subset of 50 of the original 1000 may be rekeyed as a new group). Or, a "global" compromise may simply affect all receivers in that particular subset, and the corresponding global rekeying may simply rekey the receivers in that subset.

In the examples above, the individual devices may use their OTP keys to derive a new (or replacement) derived key, which can then be used for any desired purpose. In alternative embodiments, the new (or replacement) key can be derived externally, such as by an external server 104 or 106, or by a server associated with the manufacturer of the device or security module. This externally-derived key can be encrypted by the external server, using any desired encryption algorithm, and in a manner such that the device's OTP key will be needed to decrypt the new derived key. Upon receiving the new key from the server, the device can use its OTP to decrypt the key, and store it as the new derived key in derived key storage 209. In some embodiments, an external server may generate global keys for all devices in a system.

Although the step 305 above discussed reporting an authenticated pair to the service provider, in alternative embodiments, the pair need not be reported to the service provider. For example, a broadcast encryption mechanism can be used. In such an embodiment, the service provider may transmit keying information to both parties of the pair, and may assume that the pairing was successful, without receiving a confirmation or notification. As another example, the current pairing can simply be permitted by the device, without requiring a pairing message to be sent to an external server. Alternatively, the pairing can be reported to a different server, other than the service provider. For example, an external security server or trusted authority can receive a pairing message, and send a separate authorization message to the service provider, informing the provider of the authorization and the service(s) permitted.

In addition, the discussion above used an example in which new keys can be derived in response to a security compromise. The key derivation can be initiated for other reasons as well. For example, a device reset can result in derivation of new keys. Policy settings may cause the device itself to derive new keys, or an external server can send a command to the device to initiate the key derivation process.

The discussion above used video content in some examples, but any desired content or data can be secured using features of the disclosure. For example, the content can be video, audio, audio and video, data, text, an Internet page, Internet Protocol (IP) packets, telephone data, voice over IP (VOIP), etc.

Although example embodiments are described above, the various features and steps may be combined, divided, omitted, and/or augmented in any desired manner, depending on the specific secure process desired. This patent should not be limited to the example embodiments described, but rather should have its scope determined by the claims that follow:

We claim:
1. A method comprising:
performing, by a computing device, a first encryption using a device security key stored in a first memory storage area of the computing device as cleartext;
deriving, using a first seed value comprising a combination of an address of the computing device and a first random number, a first derived key;
storing the first derived key in a second memory storage area of the computing device;
performing, after a compromise of the first derived key, a second encryption using the device security key as cleartext;
deriving, using a second seed value comprising a combination of the address of the computing device and a second random number, a second derived key; and
storing the second derived key in the second memory storage area of the computing device.
2. The method of claim 1, further comprising:
establishing a secure communication session between the computing device and an external security processor; and
using the secure communication session to transmit the first derived key to the external security processor.

3. The method of claim 1, wherein the computing device comprises a video content reception device.
4. The method of claim 1, wherein the first memory storage area and second memory storage area are physically separate memories.
5. The method of claim 1, further comprising receiving the second seed value from an external source.
6. The method of claim 1, wherein the device security key is unique to the computing device.
7. The method of claim 1, wherein the device security key is common to a plurality of other devices, and the method further comprises deriving the second derived key after a global compromise of the first derived key.
8. The method of claim 2, further comprising decrypting, by the external security processor and using the first derived key, encrypted video.
9. The method of claim 2, further comprising:
terminating the secure communication session after the compromise; and
using, by a replacement external security processor, the second derived key.
10. The method of claim 2, wherein the external security processor comprises a smart card.
11. A device comprising:
a first memory storage area configured to store a device security key as cleartext; and
a first processor configured to:
encrypt the device security key in order to derive a first derived key, wherein the encrypting uses a first seed value comprising a combination of an address of the device and a first random number;
store the first derived key in a second memory storage area of the device;
after a compromise of the first derived key, re-encrypt the device security key in order to derive a second derived key, wherein the re-encrypting uses a second seed value comprising a combination of the address of the device and a second random number; and
store the second derived key in the second memory storage area of the device, wherein the first memory storage area and the second memory storage area are secured by different types of security protection.
12. The device of claim 11, wherein the first memory storage area and the second memory storage area are encrypted using different encryption keys.
13. The device of claim 11, wherein the first memory storage area and second memory storage area are physically separate memories.
14. A security method comprising:
encrypting, by a processor, a device key stored in a first memory of a device to derive a first derived key for the device, wherein the encrypting uses:
the device key as cleartext, and
a seed value comprising a combination of an address of the device and a random number;
using the first derived key for multiple communication sessions involving the device; and
performing, based on a second seed value compromising a combination of the address of the device and a second random number and after a key comprise, a second encryption of the device key to derive a second derived key for the device, wherein the second derived key is different from the first derived key.
15. The method of claim 14, further comprising:
instructing a plurality of processors on a plurality of different devices to encrypt a common global device key to produce a common global derived key for the plurality of different devices;

determining that a compromise of the common global derived key has occurred;

determining a subset of the plurality of different devices as being affected by the compromise; and instructing the processors on the subset of the plurality of different devices to encrypt the common global device key a second time, wherein the encrypting the common global device key the second time produces a second global derived key for the subset of the plurality of different devices.

16. The method of claim 14, wherein the processor is part of a portable security device removably attached to a content access device.

17. The method of claim 14, further comprising transmitting a report of a pairing between the device and another device to a service provider, and dissolving the pairing after a compromise of the first derived key.

18. The method of claim 14, further comprising limiting use of the second derived key to the device.

19. The method of claim 14, further comprising limiting use of the second derived key to an authorized pair of devices comprising the device and a second device.

20. The method of claim 15, comprising:

splintering the subset of the plurality of different devices into two or more smaller subsets after a second key compromise, and instructing one of the smaller subsets to produce a third derived key for the smaller subset.

* * * * *

UNITED STATES PATENT AND TRADEMARK OFFICE
CERTIFICATE OF CORRECTION

PATENT NO. : 10,193,873 B2
APPLICATION NO. : 12/895121
DATED : January 29, 2019
INVENTOR(S) : Fahrny et al.

Page 1 of 1

It is certified that error appears in the above-identified patent and that said Letters Patent is hereby corrected as shown below:

In the Specification

Column 5, Detailed Description, Line 18:
Please delete "211a" and insert --211 a--

In the Claims

Column 10, Line 59:
In Claim 14, delete "compromising" and insert --comprising--

Column 10, Line 61:
In Claim 14, delete "comprise," and insert --compromise,--

Signed and Sealed this
Second Day of July, 2019

Andrei Iancu
*Director of the United States Patent and Trademark Office*